Feb. 7, 1928.

A. O. ABBOTT, JR 1,658,181

CUTTING MACHINE

Filed April 19, 1924     5 Sheets-Sheet 1

INVENTOR
ADRIAN O. ABBOTT, JR.
BY
HIS ATTORNEY

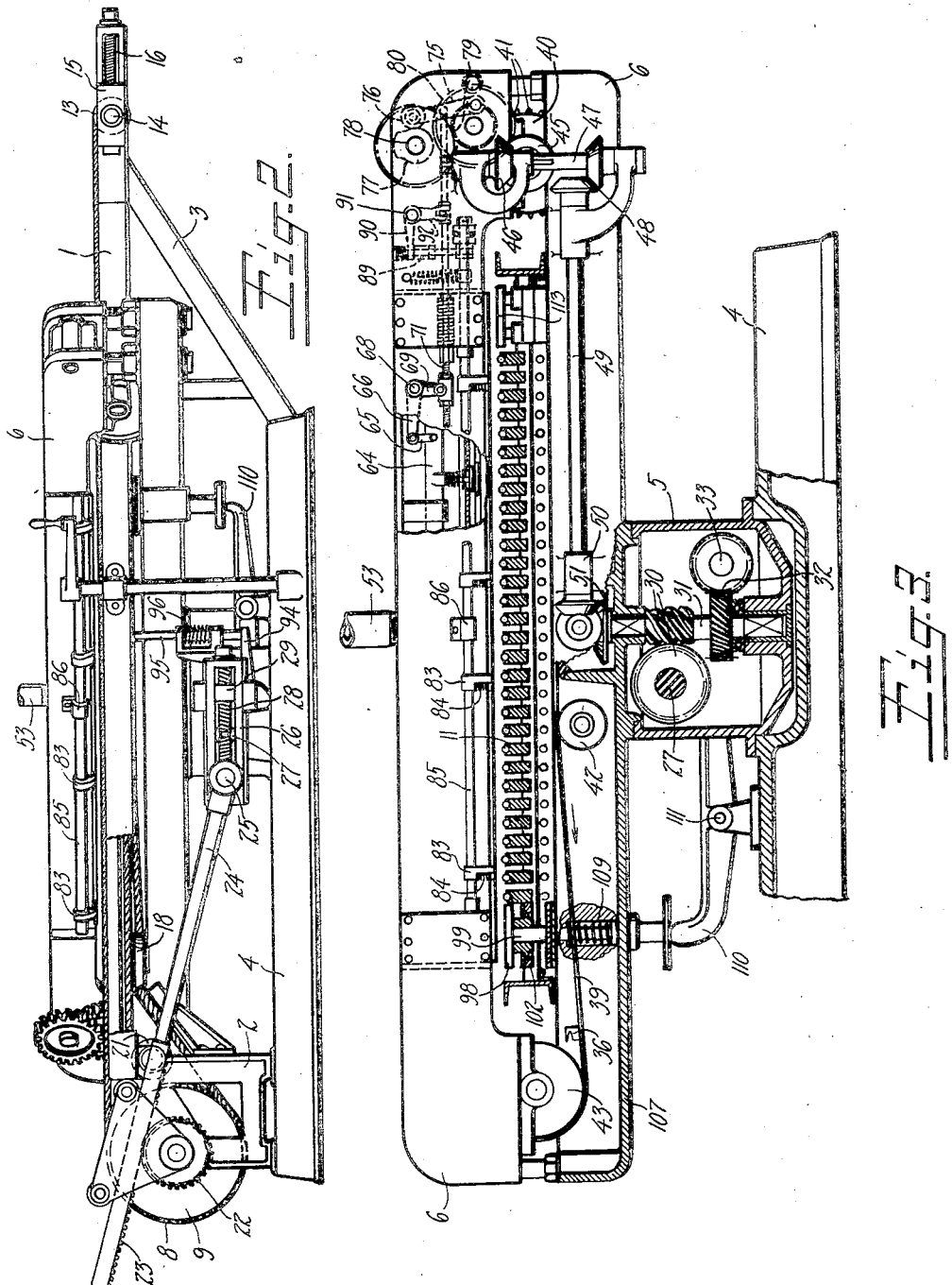

INVENTOR.
ADRIAN O. ABBOTT, JR.
BY
HIS ATTORNEY.

Feb. 7, 1928.
A. O. ABBOTT, JR
1,658,181
CUTTING MACHINE
Filed April 19, 1924          5 Sheets-Sheet 4
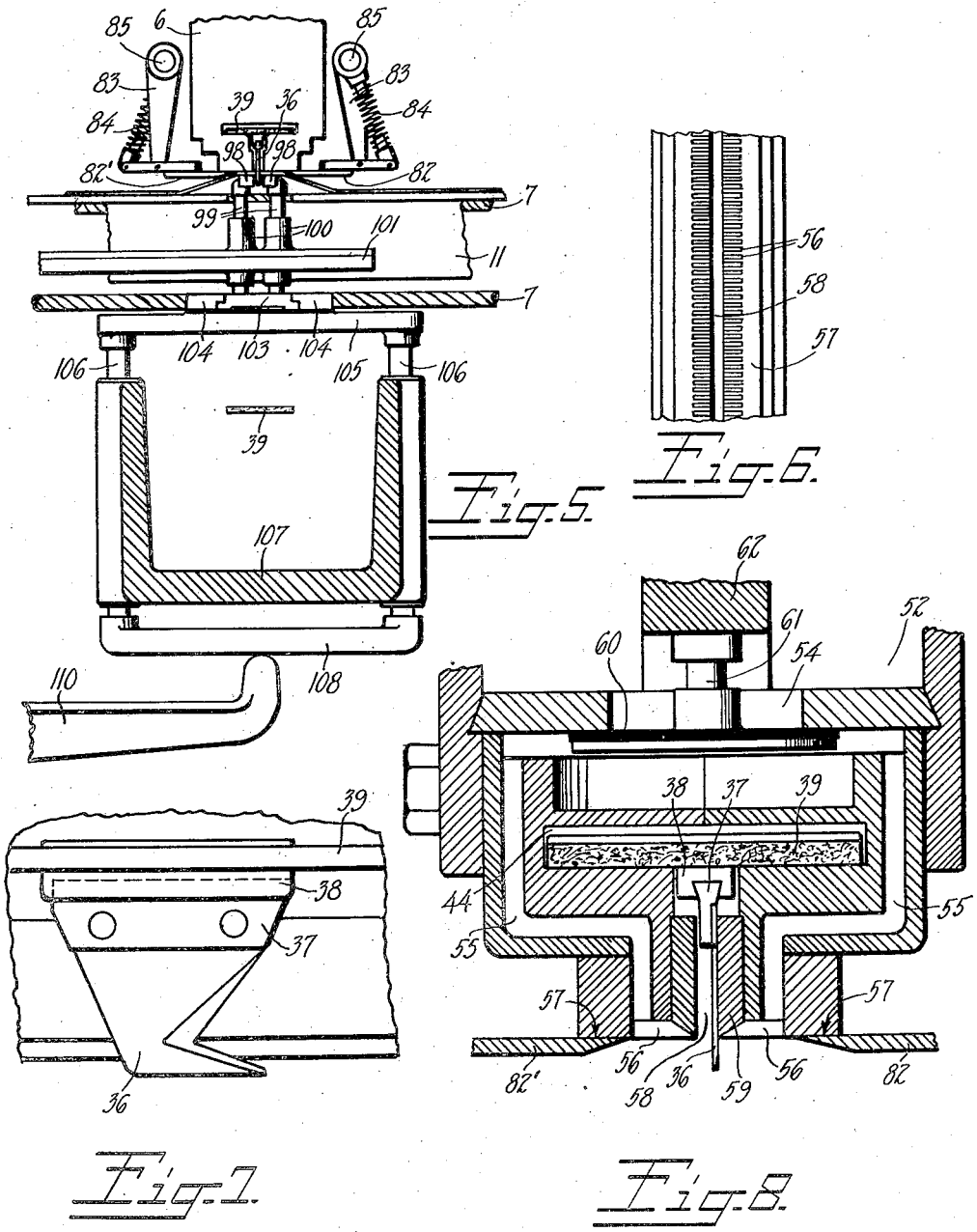
INVENTOR.
ADRIAN O. ABBOTT, JR
BY
  Ernest F. Hopkinson
          HIS ATTORNEY.

Feb. 7, 1928.

A. O. ABBOTT, JR 1,658,181

CUTTING MACHINE

Filed April 19, 1924    5 Sheets-Sheet 5

INVENTOR
ADRIAN O. ABBOTT, JR
BY
HIS ATTORNEY

Patented Feb. 7, 1928.

1,658,181

UNITED STATES PATENT OFFICE.

ADRIAN O. ABBOTT, JR., OF DETROIT, MICHIGAN, ASSIGNOR TO MORGAN & WRIGHT, OF DETROIT, MICHIGAN, A CORPORATION OF MICHIGAN.

CUTTING MACHINE.

Application filed April 19, 1924. Serial No. 707,558.

This invention relates to cutting machines in general, but is more particularly designed for cutting rubberized fabric into plies or strips that are to be incorporated in tires or other rubber articles. And this application is an improvement upon my prior application Serial No. 447,723, filed February 25, 1921, now Patent No. 1,497,765, granted June 17, 1924.

It aims to provide various features of improvement over the machine disclosed in said patent, among which features are, (1) a form of endless conveyor by which the fabric may be maintained smooth, (2) strippers for freeing the fabric from a vacuous holding chamber, (3) grippers for holding one or both margins of the web of fabric to prevent the same from curling or shifting, particularly in advance of the knife, at the initiation of a cut, and (4) a lifting device for bringing the fabric into close proximity with the vacuous holding chamber in order to render the latter more reliable and more economical in operation. These are among the objects of the invention and other features of improvement will be apparent to those skilled in the art from the subsequent description of the construction and arrangement of parts.

With the illustrated embodiment in mind and without intention to limit more than is required by the prior art, the invention consists, briefly stated, in an endless rope belt or conveyor, which is movable step by step through a head extending at an inclination across the upper flight of the conveyor or belt and carrying (1) cutting mechanism, (2) stripping mechanism, (3) gripping mechanism, (4) vacuous means for holding the fabric, and (5) a lifting mechanism for bringing the fabric close to the vacuous holding means, all of which five instrumentalities on the head are adjustable therewith to permit strips to be cut at various angles from a web of fabric.

An embodiment of the invention is illustrated in the accompanying drawings, in which:—

Figure 2 is a left-hand side elevation of the same;

Figure 3 is a cross-section of the same, the head being shown for convenience as it would appear if adjusted to a position at right angles to the length of the machine although in practice it is ordinarily located at an inclination, as indicated in Figure 1;

Figure 5 is a fragmentary section through the head, showing grippers for holding a margin of the fabric at opposite sides of the path of the knife;

Figure 6 is a bottom plan view of the vacuous holding chamber, showing suction ports:

Figure 7 is a detail, showing a cutting knife in side elevation;

Figure 8 is an enlarged section through the lower part of the cutting head, showing ports, air passages, part of the strippers, and the location of the cutting knife relative thereto;

Figure 10:
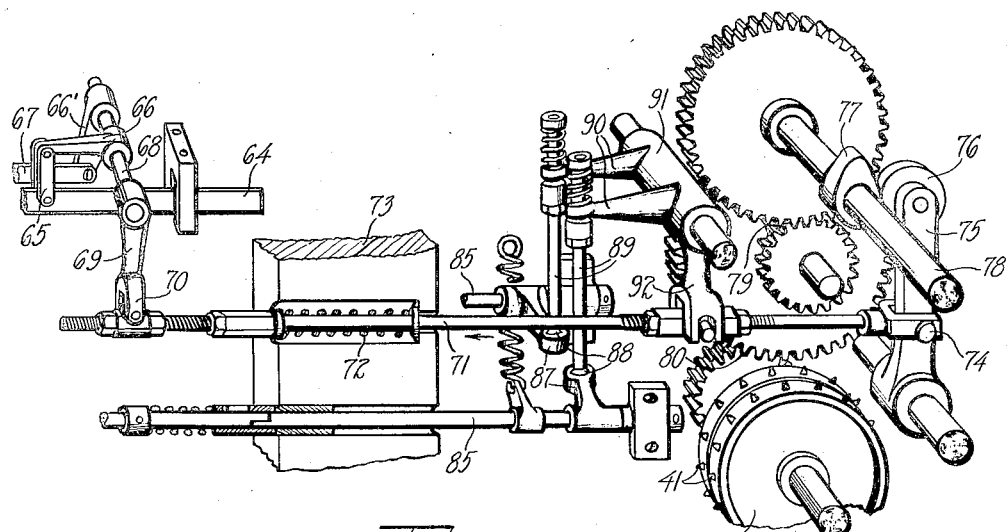

And Figure 10 is a perspective view of trains of mechanisms for operating the valves in the vacuum chamber and the strippers which are located below the same.

In the specific embodiment of the invention illustrated in the drawings, a table is indicated at 1, supported by brackets and legs 2 and 3, which are anchored to a base 4. Centrally from the base 4 rises a hollow column 5, on which is supported a head, indicated generally by the numeral 6, in and on which head are supported the cutting, holding, stripping, and lifting, instrumentalities hereinafter to be detailed. The head 6 may be swung to vary its angular relation to the length of the frame 1, by any suitable means, such as the worm and worm-wheel disclosed in my prior patent, ordinarily being located at an angle approximating 45° to the center line of the machine.

To feed the fabric, it is preferred to use an endless conveyor or belt constituted by a pair of ropes 7 and 8, twisted in opposite directions. The ropes are passed around a driving drum 9 and guided in their upper flight by grooves 10 provided in wooden bars 11, which are supported at suitable intervals by cross-bars 12 secured to the frame 1. The ropes 7 and 8 are then passed around sheaves 13 on a shaft 14, whose opposite ends are supported in blocks 15, adjustable, as indicated at 16, to maintain the proper tension on the conveyor. From the sheaves 13, the ropes are conducted below the frame 1 and around idlers 17, 18, 19, 20 (see Figure 1), and 21 (see Figure 2), the ends of each rope being suitably spliced or otherwise united. The endless conveyor 7—8 is adapted to be moved step by step by the drum 9, which is rotated through an ordinary ratchet mechanism (not shown) from a gear 22, meshing with the rack 23 fashioned on a pinion 24, connected to a crank-pin 25, which is adjustably mounted in a crank-arm 26, secured to a shaft 27, the adjustment being permitted by a right and left hand threaded rod 28, which also moves a balancing counterweight 29, minimizing vibration. The shaft 27, to which the crank-pin 25 is adjustably secured, is rotated by the worm and worm-wheel, indicated at 30, Figure 3, the worm being fashioned at 30, on a vertical shaft 31, disposed centrally of the column or pedestal 5, which supports the head 6. This vertical shaft 31 is driven through inter-meshing spiral gearing 32, from a main shaft 33 (see Figures 1 and 3), the latter being adapted to be driven at will by suitably coupling it up with a clutch, indicated conventionally at 34, to a main driving pulley 35, which may be rotated by a belt, or in any other suitable manner, by the connections detailed, the belt or conveyor 7—8 is adapted to be moved step by step and thereby advance a web of fabric a distance past the cutting head 6, pre-determined by the adjustment of the crank-pin 25.

Figure 1:
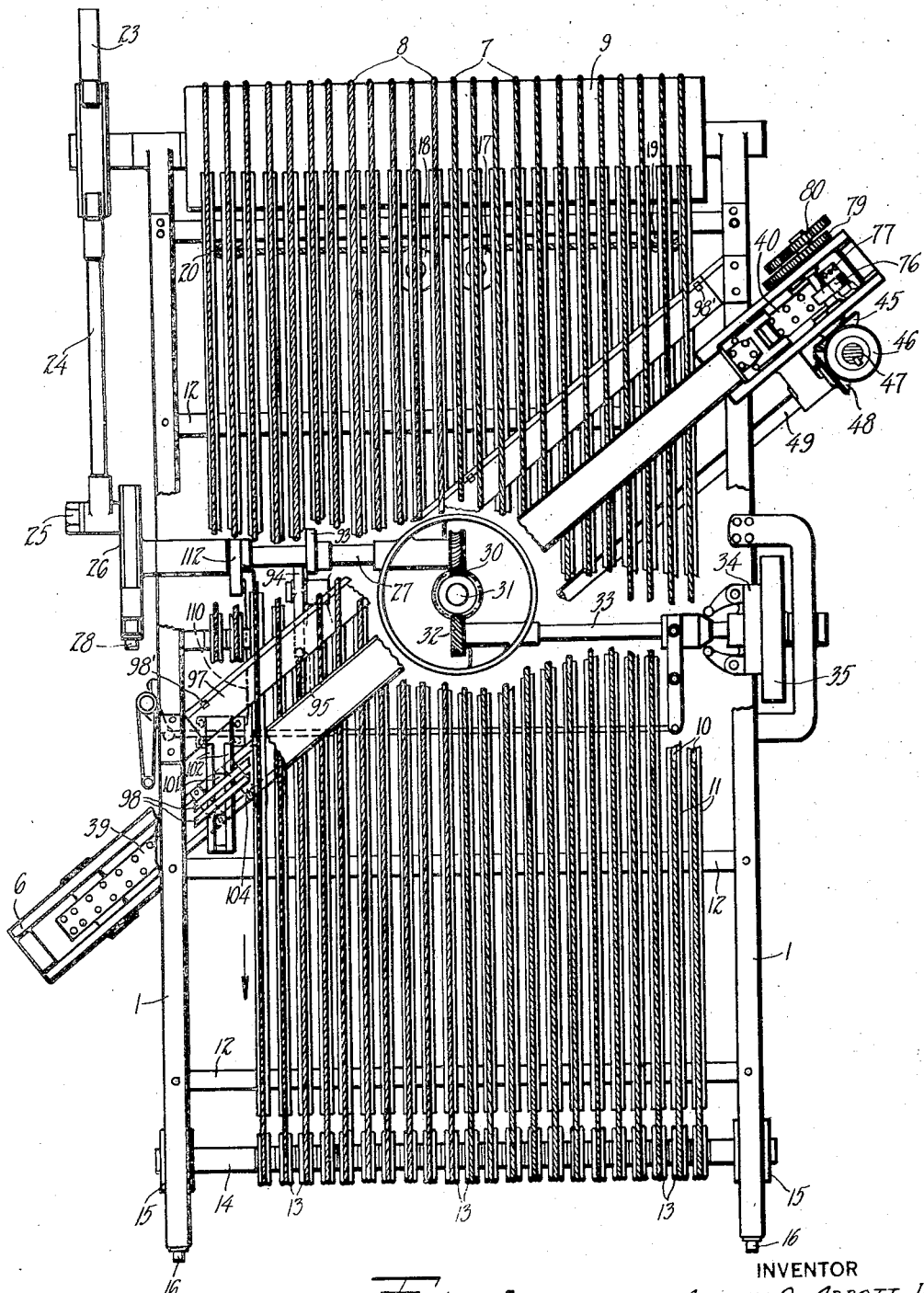
Figure 1 is a plan view of the machine somewhat foreshortened, parts being broken away for better illustration.

The cutting mechanism comprises a knife 36 (see Figures 7 and 8), which is preferably replaceably mounted by means of its dovetailed head 37, in a correspondingly shaped groove provided in a block 38, which is secured in any suitable manner to an endless belt or carrier 39 (see also Figures 1 and 3). The belt 39 is driven from a pulley 40, whose face is provided with studs 41, entering holes in the belt. The belt 39 passes over an idler 42, and at the opposite side of the head encircles a second pulley 43 which, like pulley 40, is journaled in the head 6, the latter being provided with a passage 44 (see Figure 8), to accommodate the upper flight of the belt. The stud-faced pulley 40 is driven through a bevelled gear 45, fast on its axis, which is rotated by a correspondingly bevelled pinion 46, keyed to a shaft 47 (see Figure 3), rotated through a pair of intermeshing bevelled gears 48, from a horizontal shaft 49, that is suitably journaled in bosses 50, secured to the head 6. The shaft 49, in turn, is rotated through co-operating bevelled pinions 51 at the top of the vertical shaft 31, in the central pedestal 5, which is driven from the main shaft 33, as beforementioned. In this way, the knife 36 is continuously moved in an endless path, and in one portion of its flight, passes just above the rope conveyor 7—8.

Figure 4:
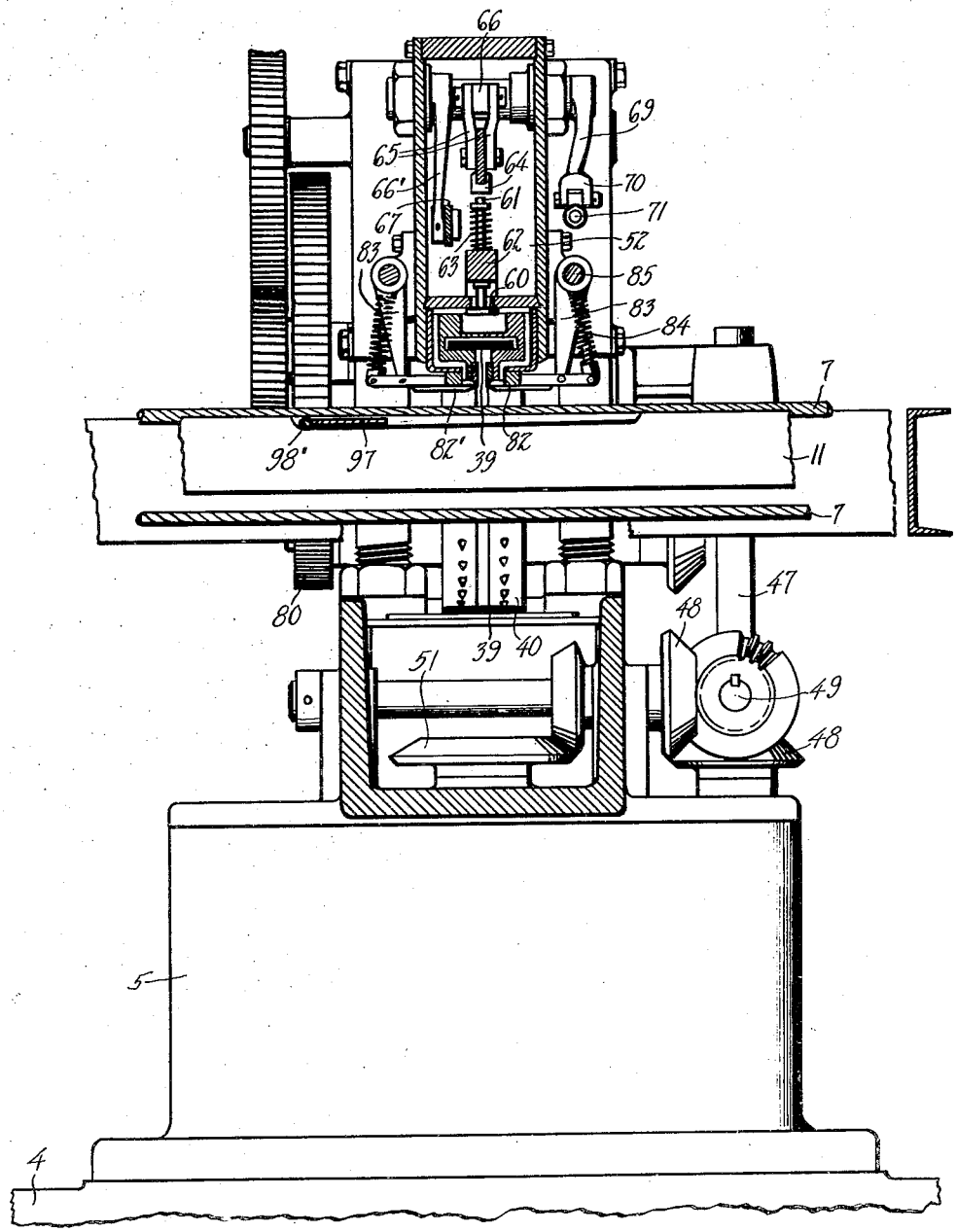
Figure 4 is a section through the head frame swung to a position at substantially right angles to the length of the machine.

To hold the fabric in a position such that the knife 36, which is located on the inside of the belt 39, may sever the same without injury to the feed conveyor, a suction box or vacuous chamber 52 is provided in the head 6 immediately above the top flight of the endless belt 39, which carries the knife. See Figures 4 and 8. Air is exhausted from the chamber 52 through the outlet pipe 53, connected up with any suitable sort of evacuating means. At the lower side of the chamber 52, are provided a number of valve-controlled ports 54 (see Figure 8), in communication with passages 55, terminating in slots 56 (see also Figure 6), through which, at the right intervals, air is sucked or drawn in such a manner as to draw and hold the fabric against the bottom face 57 of the cutting head 6. It will be noticed that the slots 56 are provided on opposite sides of the knife 36, a passageway 58 for the knife being flanked by bars 59 bevelled as indicated, at their lower edges, and functioning somewhat as ledger blades.

To open and close the ports 54 at the lower side of the suction box or vacuum chamber 52, rubber-faced valves 60 are provided. These may be of any suitable type, but preferably are, as shown, constructed with a stem 61, guided in a fixed bar 62, above which the stems are surrounded with springs 63, normally holding the disk portions 60 in the closed position illustrated in Figure 8. To operate the valves 60 at the proper times so as to hold the fabric while it is being cut and thereafter release it so that it may be fed, a tappet bar 64 is provided in the vacuum chamber 52. This bar extends the greater portion of the length of the chamber 52, immediately above the valve stems 61, and is supported at each of its opposite ends by links 65, depending from one arm of bell-cranks 66, which are coupled together for movement in unison by a bar 67, connected to the other arm 66' thereof. One of the bell-cranks 66—66' is mounted on a shaft 68, which is conducted by the suction box 52 outwardly through the wall thereof where it is provided with a depending arm 69, articulated, as indicated at 70, to a shaft 71, normally urged in the direction of the arrow by a coiled spring 72, housed within a rigid part 73 of the frame. The rod 71 is pinned, as indicated at 74, to a pivoted arm 75, provided with a roller 76, tracking a cam 77 on a shaft 78, which is driven through the reducing gearing indicated at 79 and 80, from the shaft 81, carrying the knife belt driving pulley 40. By the mechanism above detailed, the bar 64 is intermittently depressed so as to open the valves 60 and allow air to rush in through slots 56 and passages 55 to the vacuum chamber 52, thereby holding the fabric against the bottom surface 57 of the cutting head from a time a little before the knife 36 starts to cut to and shortly after the completion of the cut. When the cut is completed, the tappet bar 64 is lifted and the valves are closed by the action of their springs 63.

To free the fabric on both sides of the line of cut from the vacuum chamber to the bottom face 57 of which a tacky material, such as rubberized fabric, is liable to cling, stripper plates 82 and 82' are provided. These are of substantially identical construction and are operated by similar mechanism, only one of which it is necessary to describe. Each of the stripper plates 82 and 82' is loosely pinned to an arm 83 and normally held against the bottom surface 57 of the vacuum chamber by a compression spring 84. The arms 83, which are secured to a rock-shaft 85 (see Figure 10), are suitably mounted in bosses 86 on the outside of the cutting head 6. Each of the shafts 85 is provided with arms 87 ball-jointed, or otherwise articulated, as indicated at 88, to rods 89, which are yieldingly connected to the arm 90 of a bell-crank 91, whose other arm 92 is yoked to a rod 71, which is reciprocated, as previously detailed, from the pulley 40 driving the knife carrying belt 39. When the rod 71 is moved to the right, as viewed in Figure 10, the strippers 82—82' are separated and uncover the suction ports 56. When the rod 71 is moved to the left, as viewed in Figure 10, the strippers are moved towards each other and between the fabric and the bottom surface 57 of the vacuum chamber, thereby freeing the fabric positively and mechanically, so that it falls back upon the conveyor 7—8 after the completion of a cut.

To render the vacuous holding means more reliable in operation and to economize in the use of evacuating apparatus, it is desirable to bring the fabric into proximity with the bottom of the vacuum chamber, i. e., close to the surface 57, in which are provided the suction ports 56. To this end, there is provided on the crank-shaft 27 (see Figures 1 and 2), a cam 93 which, through a pivoted lever 94, operates a vertical rod 95 normally held down by a spring 96. The rod 95 engages the lower surface of a plate or bar 97 that is hinged, as indicated at 98' (see Figures 1 and 4). By reference to these figures, it will be apparent that elevating the bar or plate 97, which is disposed immediately below the ropes 7—8, will raise the latter and bring the fabric supported thereon close to the bottom of the vacuum chamber 52. Immediately after the vacuum valve 60 has been opened, the cam 93 permits the bar or plate 97 to fall, thus dropping the ropes 7—8 out of the way of the cutting knife 36.

Pairs of grippers are preferably provided adjacent the ends of the cutting head 6 for holding the margins of a web of fabric. One of these is operated mechanically and the other pneumatically, or rather vacuously. Referring to Figures 1, 3 and 5, the mechanically operated pair of grippers comprises bars 98 mounted at opposite sides of the line of cut, each rigidly secured to the upper end of posts 99, which are slidably mounted in bosses 100 of a plate 101, which is shiftable in gibs 102, disposed and maintained parallel to the length of the machine. Below the gibs 102, the posts 99 are secured to a cross-head 103, which is slidable in a second pair of gibs 104 disposed at substantially right angles to the length of the head 6 and secured to a yoke 105. The yoke 105 has two depending stems 106, which pass through the casing 107, constituting part of the head 6, and are secured to a plate 108. In the casing 107, as illustrated in Figure 3, is mounted a spring 109, which normally urges the yoke 105 downwardly and consequently also the gripping bars 98. To operate the plate 108, which is permanently connected with the yoke 105, a lever 110 is provided, being pivoted, as indicated at 111, Figure 3, and operated by a cam 112, see Figure 1, on the beforementioned crank-shaft 27. In this manner, a pair of the grippers 98 may be positively elevated to hold the fabric against the bottom surface 57 of the head 6 at a point just beyond the termination of the suction ports 56.

Figure 9:
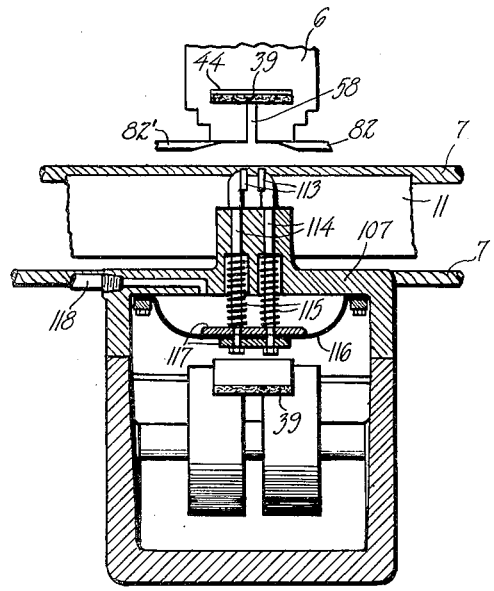
Figure 9 is a fragmentary cross-section of the cutting head, showing a second and vacuously operated pair of grippers for holding the margin of the fabric last cut.

The second pair of grippers located at the other side of the machine (but omitted from Figure 1 for clarity of illustration) is shown in detail in Figure 9 of the drawings. There are two such gripping bars, indicated at 113, each mounted on a post 114, slidable in a portion of the casing 107 below which it is encircled by a coiled spring 115. The ends of the posts are passed through a rubber diaphragm 116, suitable clamping plates 117 being provided to make a tight joint at the ends of the posts 114. By means of a conduit 118, which is preferably placed in communication with one of the passages 55, leading to the suction ports 56, air is exhausted from within the diaphragm 116 at the same time as it is exhausted through the ports 56. And when the vacuum is eliminated by closure of the valves 60, and the vacuum ports 56 uncovered by outward movement of the strippers 82—82', air under atmospheric pressure is admitted to the upper side of the diaphragm so as to balance the pressure on the opposite sides thereof. In this manner, the grippers 113, which are also located on opposite sides of the line of cut, are automatically raised and lowered in unison with the application of suction to the head 6.

The two pairs of grippers 98 and 113 at opposite sides of the machine, permit various widths of fabric to be cut without unnecessary expense in operation of the vacuum. Of course, both pairs of grippers could be operated mechanically or vacuously, if desired, but it is preferred to employ the combination and arrangement described and illustrated.

Operation:—The fabric to be cut is led from a roll (not shown) in any suitable and convenient manner to the machine and applied to the conveyor constituted by the ropes 7—8. The crank-pin 25 is adjusted to give the proper step by step advance to the fabric for cutting it into strips of a desired width. Air is exhausted from the vacuum chamber 52 through the line 53. Then the clutch 34 is engaged to start the machine. The conveyor 7—8 moves forward step by step. As the conveyor completes its movement, the lifter 97 is raised, bringing the fabric into close proximity with the suction ports 56, which are in communication with the vacuum chamber 52. The valves 60 are opened to permit the air to rush into the vacuum chamber and thereby raise the fabric and close the suction ports 56. Evacuation continuing, the fabric is thereby held gripped to the lower face 57 of the head 6. The grippers 98—113 hold the margins of the fabric firmly and as they extend beyond the vacuum chamber 56, they permit considerable variation in the width of stock without exposing any of the ports and permitting leakage. The lifter 97 drops immediately after the valves 60 are opened. After this, the knife 36 starts to cut. When the knife 36 has severed about one third (more or less) of the width of the fabric, the grippers 98 are released. After the knife finishes the cut, the valves 60 are closed and the strippers 82—82' are moved inwardly whereupon the grippers 113 drop. The cut edges of the fabric are thus freed and drop upon the conveyor 7—8, which then advances another step. While the fabric is being advanced by the conveyor 7—8, the knife 36 traverses its upper flight and returns to a position ready for the next cut. The cycle of operations is then repeated.

In the foregoing, the invention has been detailed with respect to one specific embodiment thereof. It will be understood that in the broadest aspects of the invention, one or more, or all, of the essential elements of the organization may be varied in form without departing from the principles underlying the invention. For instance, an ordinary continuous or perforated belt might be substituted for the rope conveyor 7—8. Other instances are obvious and need no enumeration. The invention is not intended to be limited to the details of construction hereinbefore specified excepting as they may appear in the claims to which reference should be made for an understanding of the breadth and scope of the invention.

Having thus described my invention, what I claim and desire to protect by Letters Patent is:—

1. In a cutting machine, the combination with means for severing a web of fabric, of means for feeding the web of fabric including a belt having parallel strands of oppositely twisted rope directly supporting the web of fabric.

2. In a cutting machine, the combination with means for severing a web of fabric, of means for intermittently feeding the web of fabric including a conveyor belt composed of oppositely twisted ropes.

3. In a cutting machine, the combination with means for severing a web of fabric, of means for feeding the web of fabric including a pair of oppositely twisted ropes, and members about which said ropes are each looped a plurality of times to define an endless movable support for the web of fabric.

4. In a cutting machine, in combination, an intermittently movable conveying rope-belt for advancing fabric made up of oppositely twisted ropes, gripper members for intermittently holding the fabric, and means for cutting the fabric transversely including a cutting blade movable in an endless path a portion of which intersects the fabric.

5. In a cutting machine, in combination, an intermittently movable rope-belt for feeding fabric made up of oppositely twisted ropes, vacuous means for intermittently holding the fabric, and means for cutting the fabric transversely including a cutting blade movable in an endless path a portion of which intersects the fabric.

6. In a cutting machine, in combination, an intermittently movable rope-belt for advancing fabric, vacuous means for intermittently holding the fabric, means for cutting the fabric transversely including a cutting blade movable in an endless path a portion of which intersects the fabric, and stripper members for releasing the fabric from the holding means.

7. In a cutting machine, in combination, fabric feeding means including an endless rope conveyor, fabric cutting means including a knife and an endless carrier for the knife encircling the conveyor, and gripper members for lifting fabric clear of the conveyor and in the path of the knife for permitting severance thereof into strips.

8. A cutting machine having in combination, means for feeding a web of fabric, means for severing the web into strips, vacuous means for holding the fabric while being cut, and mechanical means for freeing the fabric from the vacuous holding means after each cutting operation.

9. A cutting machine having in combination, means for intermittently feeding a web of fabric, means for severing the web into strips, vacuous means for holding the fabric while being cut, and mechanical means for freeing the fabric from the vacuous holding means after each cutting operation, said mechanical means including members movable between the vacuous holding means and the intermittent feeding means.

10. A cutting machine having in combination, means for intermittently feeding a web of fabric, means for severing the web into strips, vacuous means for holding the fabric while being cut, and mechanical means for freeing the fabric from the vacuous holding means after each cutting operation, said mechanical means including members movable across the bottom of the vacuous holding means substantially in planes parallel to the plane of feed.

11. In a cutting machine, in combination, an intermittently movable rope-belt for feeding the fabric, vacuous means for intermittently holding the fabric, means for cutting the fabric transversely including a cutting blade movable in an endless path a portion of which intersects the fabric, and mechanical means for freeing the fabric from the vacuous holding means.

12. In a cutting machine, in combination, an intermittently movable rope-belt for advancing fabric, vacuous means for intermittently holding the fabric, means for cutting the fabric transversely including a cutting blade movable in an endless path a portion of which intersects the fabric, and means for releasing the fabric from the holding means including strippers movable oppositely in a plane parallel to the plane of feed and adjacent the bottom of the vacuous holding means.

13. In a cutting machine, in combination, an intermittently movable rope-belt for advancing fabric, vacuous means for intermittently holding the fabric, means for cutting the fabric transversely including a cutting blade movable in an endless path a portion of which intersects the fabric, and means for releasing the fabric from the holding means including strippers movable across and yieldingly pressed against the bottom of the vacuous holding means.

14. In a cutting machine, in combination, an intermittently movable rope-belt for feeding fabric, vacuous means for intermittently holding the fabric, means for cutting the fabric transversely including a cutting blade movable in an endless path a portion of which intersects the fabric, and means for positively gripping a margin of the fabric at the start of a cutting operation.

15. In a cutting machine, in combination, fabric-feeding mechanism including an endless conveyor movable step by step, vacuous means for intermittently holding the fabric, fabric cutting mechanism, means for gripping a margin of the fabric at the start of a cutting operation, and a common adjustable support for the holding cutting and gripping mechanisms whereby strips may be cut at various angles.

16. In a cutting machine, in combination, means for feeding a web of fabric, vacuous means for intermittently holding the fabric, means for cutting the fabric transversely including a cutting blade movable in an endless path a portion of which intersects the fabric, and means for positively gripping a margin of the fabric at the start of a cutting operation.

17. In a cutting machine, in combination, means for feeding a web of fabric step by step, vacuous means for intermittently holding the fabric, means for cutting the fabric, grippers for supplementing the holding action of the vacuous means at a margin of the web of fabric, and means for rendering said grippers effective immediately before the fabric is severed and for rendering the same ineffective after the start of the cutting operation.

18. In a cutting machine, in combination, means for feeding a web of fabric step by step, vacuous means for intermittently holding the fabric, means for cutting the fabric, grippers for supplementing the holding action of the vacuous means at a margin of the web of fabric, and means permitting adjustment of said grippers for different cutting angles.

19. In a cutting machine, in combination, means for feeding a web of fabric step by step, vacuous means for intermittently holding the fabric, means for cutting the fabric, and grippers for supplementing the holding action of the vacuous means at a margin of the web of fabric, said grippers being adapted to engage the fabric at opposite sides of the line of cut adjacent the margin of the fabric initially severed.

20. In a cutting machine, means for treating the fabric, means for severing the fabric, and means for vacuously holding the fabric while it is being severed, in combination with, means for intermittently lifting the fabric toward the vacuous holding means to increase the reliability and economy in operation of the same.

21. In a cutting machine, in combination, an endless belt movable step by step for feeding a web of fabric, a cutting mechanism, vacuous means for holding the fabric clear of the endless belt, and means for lifting the belt nearer to the vacuous holding means.

22. In a cutting machine, in combination, an endless rope conveyor, means for moving the same step by step, a knife, means for continuously moving the same in an endless path a portion of which is in proximity to the endless rope conveyor, a suction head supported above and transverse the endless rope conveyor, means for intermittently evacuating the suction head, and means for intermittently elevating the endless conveyor to economize in the operation of the suction head.

23. In a cutting machine, in combination, an endless rope conveyor, means for moving the same step by step, a knife, means for continuously moving the same in an endless path a portion of which is in proximity to the endless rope conveyor, a vacuum head supported above and transverse the endless rope conveyor, means for intermittently evacuating the vacuum head, and means for intermittently elevating the endless conveyor to economize in the operation of the vacuum head, said last-named means including a member encircled by the endless rope conveyor and on the opposite side of a flight thereof from the vacuum head.

24. In a cutting machine, in combination, an endless rope conveyor, means for moving the same step by step, a knife, means for continuously moving the same in an endless path a portion of which is in proximity to the endless rope conveyor, a vacuum head supported above and transverse the endless rope conveyor, means for intermittently evacuating the vacuum head, and means for intermittently elevating the endless conveyor to economize in the operation of the vacuum head, said last-named means including a hinged bar and means for intermittently shifting the same toward and from the vacuum head.

25. In a cutting machine, in combination, means for feeding fabric step by step, continuously movable means for cutting the fabric into strips, vacuous means for holding the fabric while it is being cut, means for gripping the margin of the fabric initially cut, means for intermittently lifting the fabric to increase the efficiency of the vacuous holding means, and means for stripping the fabric after it has been cut from the vacuous holding means.

26. In a cutting machine, in combination, means for feeding fabric step by step, continuously movable means for cutting the fabric into strips, vacuous means for holding the fabric while it is being cut, means for gripping the margin of the fabric initially cut, means for intermittently lifting the web of fabric into proximity to the vacuum holding means, and means for stripping the fabric after it has been cut from the vacuous holding means, all of said means excepting the first-named means being adjustable to permit strips to be cut at various angles.

27. In a cutting machine, in combination, means for feeding fabric step by step, continuously movable means for cutting the fabric into strips, vacuous means for holding the fabric while it is being cut, means for gripping the margin of the fabric initially cut, means for intermittently lifting the feeding means and the web of fabric to increase the efficiency of the vacuum holding means, and means for stripping the fabric after it has been cut from the vacuous holding means, all of said means excepting the first-mentioned means being mounted on a common adjustable support whereby to permit strips to be cut at various angles.

Signed at Detroit, county of Wayne, and State of Michigan, this 14th day of April, 1924.

ADRIAN O. ABBOTT, Jr.